(12) United States Patent
Saito et al.

(10) Patent No.: US 6,372,832 B1
(45) Date of Patent: Apr. 16, 2002

(54) GLYCOL DISPERSION OF INORGANIC POWDER, PROCESS FOR PRODUCING THE SAME, AND POLYESTER COMPOSITION CONTAINING THE DISPERSION

(75) Inventors: Naofumi Saito; Seiya Shimizu; Kazunori Ohide; Shiro Minayoshi, all of Hyogo (JP)

(73) Assignee: Maruo Calcium Company Limited, Akashi (JP)

( * ) Notice: Subject to any disclaimer, the term of this patent is extended or adjusted under 35 U.S.C. 154(b) by 0 days.

(21) Appl. No.: 09/462,785

(22) PCT Filed: Jul. 14, 1998

(86) PCT No.: PCT/JP98/03139

§ 371 Date: Jan. 13, 2000

§ 102(e) Date: Jan. 13, 2000

(87) PCT Pub. No.: WO99/03913

PCT Pub. Date: Jan. 28, 1999

(30) Foreign Application Priority Data

Jul. 16, 1997 (JP) .............................. 9-208559

(51) Int. Cl.$^7$ .............................. B01F 17/52; C08J 3/22; C08K 3/26; C08K 3/36; C08L 67/02
(52) U.S. Cl. .................. 524/377; 106/465; 106/491; 252/363.5; 516/33; 516/34; 524/425
(58) Field of Search .............................. 516/34, 87, 33, 516/88; 252/363.5; 106/491, 465; 524/377, 425

(56) References Cited

U.S. PATENT DOCUMENTS

| | | | | |
|---|---|---|---|---|
| 2,858,284 A | * | 10/1958 | Acker et al. ............... | 516/34 X |
| 2,921,913 A | * | 1/1960 | Alexander ................... | 516/34 |
| 2,984,629 A | * | 5/1961 | Loftman et al. ........... | 516/87 X |
| 3,004,921 A | * | 10/1961 | Stossel ........................ | 516/34 |
| 3,629,139 A | * | 12/1971 | Vossos ........................ | 516/34 |
| 4,013,578 A | * | 3/1977 | Child et al. ........... | 252/363.5 X |
| 5,000,871 A | * | 3/1991 | Minayoshi et al. ............ | 516/33 |
| 5,076,846 A | * | 12/1991 | Buri et al. ............ | 252/363.5 X |
| 5,085,800 A | * | 2/1992 | Minayoshi et al. ............ | 516/33 |
| 5,236,622 A | * | 8/1993 | Yoneda et al. ............. | 516/34 X |
| 5,275,652 A | * | 1/1994 | Dastol ....................... | 516/87 X |
| 5,304,324 A | * | 4/1994 | Yoneda et al. ............. | 516/34 X |
| 5,316,714 A | * | 5/1994 | Yoneda et al. ............. | 516/34 X |
| 5,472,493 A | * | 12/1995 | Regan ......................... | 106/491 |
| 5,674,443 A | * | 10/1997 | Lee et al. ................ | 524/425 X |

FOREIGN PATENT DOCUMENTS

| JP | 47-47294 | * | 11/1972 |
|---|---|---|---|
| JP | 48-13335 | * | 4/1973 |
| JP | 62-151431 | * | 7/1987 |
| JP | 63-221158 | * | 9/1988 |
| JP | 63-268734 | * | 11/1988 |

OTHER PUBLICATIONS

International Search Report dated Nov. 24, 1998.*

* cited by examiner

*Primary Examiner*—Richard D. Lovering
(74) *Attorney, Agent, or Firm*—Armstrong, Westerman & Hattori, LLP

(57) ABSTRACT

A glycol dispersion of an inorganic powder is provided, which comprises glycol and an inorganic powder dispersed therein, said inorganic powder being surface-treated with a dispersant having a solubility of not less than 5 (g/100 g-water) in water of 20° C., and which contains water and/or methanol in the specific amounts. According to the present invention, it is not required to transport a slurry of water, methanol or glycol, but possible to transport in the form of powder, so that efficiency in transportation is not only enhanced, but a drastic simplification in the production steps and a cost reduction are attainable because neither a distillation apparatus for replacing a solvent such as water and methanol with glycol nor a step of wet-pulverizing is required. Moreover, a glycol dispersion of the present invention is able to reproduce the excellent shape and size of the inorganic particles before drying or in the initial state and therefore has an excellent dispersibility.

11 Claims, 1 Drawing Sheet

GLYCOL DISPERSION OF INORGANIC POWDER, PROCESS FOR PRODUCING THE SAME, AND POLYESTER COMPOSITION CONTAINING THE DISPERSION

TECHNICAL FIELD

This application is a 371 of PCT/JP98/03139 filed Jul. 14, 1998.

The present invention relates to a glycol dispersion of an inorganic powder and production method thereof, and a polyester composition containing said dispersion. More particularly, the present invention relates to a glycol dispersion of an inorganic powder and production method thereof, and a polyester composition containing said dispersion, which attain simplification of production steps, reduction of transportation cost and prevention of breakage of inorganic particles in a method for dispersing an inorganic powder in glycol such as ethylene glycol in an attempt to improve a coefficient of friction and hue of a polyester, and to impart opacity and micropores to a polyester, which is for use in film or fiber, in particular.

BACKGROUND ART

Nowadays, polyester produced industrially, especially polyethyleneterephthalate has excellent physical and chemical characteristics and thus has been widely used as fiber, film and other molded articles. In such a polyester composition, it has been conventionally carried out to cause fine particles to be contained in polyester in order to improve a coefficient of friction and hue of polyester and to impart opacity and micropores to polyester.

For example, in the case of reducing a coefficient of friction, it is known that since polyester is inferior in slipperiness in molding and processing steps as well as in handling of products, troubles such as deterioration in workability and commercial value arise, in spite of its excellent characteristics. Most of such causes come from a high coefficient of friction of polyester itself. As a measure to these troubles, many methods are proposed and put into practice which allow fine particles to be contained in polyester to thus impart appropriate unevenness to the surface of a molded article so that surface smoothness of the molded article is improved.

As means of improving the surface characteristics of polyester, the following two methods have been known:

(1) a method for separating out a part or whole of a catalyst or the like used for the synthesis of polyester in the reaction process (internal particle separating-out method), and (2) a method for adding fine particles such as calcium carbonate and silicon dioxide in the course of or after polymerization (external particle adding method).

However, the internal particle separating-out method (1) has a drawback of having difficulty in controlling the amount and size of particles and in preventing the formation of coarse particles because in this method particles are to be formed during reaction, though the affinity between polyester and particles is somewhat good, for such particles consist of a metallic salt of a polyester component.

The external particle adding method (2), which consists in adding fine particles of an inorganic compound insoluble in and inert to polyester such as titanium dioxide, silica, talc, kaolin and calcium carbonate during or after polymerization, is superior to the method (1) described above with regard to the improvement of sliding property, if the particle size and the amount of addition of the inorganic compound are properly selected and coarse particles are removed by classification or the like in advance.

Also, for the improvement of dispersibility in polyester of such fine particles of an inorganic compound there is proposed a method of preparing a glycol slurry of fine particles of an inorganic compound and adding it in the process of the polyester manufacture, but there is something to be desired about the dispersibility as well as long-term dispersion stability of such fine particles of an inorganic compound in glycol, hence, when the glycol with such fine particles of an inorganic compound suspended therein is stored for a long period of time, there are problems that such fine particles of an inorganic compound precipitate to form hard cakes which are difficult to redisperse, and that fine particles of such inorganic compound agglomerate in glycol or in the course of manufacture of polyester. The presence of agglomerated coarse particles in polyester causes yarn breakage in the spinning process, formation of the so-called "fish eye" and, in particular, drop-out or lowering of S/N ratio when it is used for the manufacture of film for magnetic tape.

As the particles having a high dispersibility used such uses, vaterite calcium carbonate, spherical silica prepared by a sol-gel method, calcite cubic calcium carbonate may be exemplified. Those are produced by a high technique so that individual particles may be present without aggregation. Those are usually prepared in water or alcohol and it is necessary to prepare a slurry of the monodispersed particles and glycol by substituting water or alcohol with glycol while maintaining a high dispersion. For this purpose, a vacuum distiller such as an evaporator is used but this method is high expensive. Moreover, even when the glycol slurry prepared in this way is transported to a place where polyester is produced, or even when a slurry containing water or methanol is transported to a production place of polyester and distilled therein, there is not a bit of difference between the two in that the transportation is made in the form of slurry so that a decrease in transportation efficiency and an increase in transportation cost are not avoidable.

In order to solve those problems, it is considered to obtain a powder by drying the particles monodispersed in water or methanol by the use of a dryer such as a spray dryer, and to mix the powder with glycol to thus prepare a glycol slurry. However, the monodispersed particles, when dried, form aggregates and therefore the monodispersed particles prepared in this method are not redispersed in glycol in good dispersion state of the original particles.

Moreover, Japanese Patent Examined Publication No. 2-48174 proposes a method for obtaining good dispersibility by wet-pulverizing in glycol a precipitated calcium carbonate having the specific dispersibility and particle size under the specific conditions. Although this method is said to be good in uses in which ununiformity of the particle shape in glycol dispersion is not problematic, it is not suitable for spherical or cubic monodisperse calcium carbonate having the uniform shape and particle size.

Although, for example, a glycol dispersion having a good dispersibility is obtained if spherical calcium carbonate or silica obtained by a spray dryer is used in the form of powder as a wet-pulverizing material and its glycol slurry is wet-pulverized according to the method described in the above publication, a cost is not only increased since the wet-pulverizing step is added, but the shape is irregular due to the pulverization and the original shape is lost. In addition, unintended fine particles occasionally generate due to the pulverization and they reaggregate to form coarse particles in the production step of polyester, which deteriorates the physical properties of the composition. Furthermore, in the method described in the publication, fragments of a medium such as glass used for the pulverization are mingled into the pulverized matters. The fragments are usually coarse particles of 10 to 100 μm and thus this method is not suitable for film of polyester or the like.

As stated above, it is difficult to prepare a glycol dispersion by dispersing an inorganic powder in glycol while maintaining its shape and particle size before drying or in the initial state. Therefore, it is impossible to transport inorganic particles in the form of powder for the purpose of reducing a transportation cost and for this reason, the transportation in the form of slurry is forced, otherwise, even when the transportation in the form of powder is possible, it is very expensive to prepare a glycol slurry of satisfactory dispersion from this powder.

In light of the foregoing situation, the present invention provides a method for producing a glycol dispersion which is not only capable of a drastic simplification in the production steps and a reduction in cost by omitting the use of an distillation apparatus for substituting a solvent such as water and methanol with glycol, requiring neither transportation of water, methanol or glycol slurry nor a wet-pulverization step, but capable of dispersing an inorganic powder in glycol with maintaining its particle shape and particle size before drying or in the initial state, and further provides a polyester composition containing the glycol dispersion of the inorganic powder uniformly dispersed in glycol.

DISCLOSURE OF THE INVENTION

The present inventors have made an extensive series of studies in an attempt to solve the above problems and have found out that a glycol dispersion is obtained which not only has an excellent dispersibility, but realizes a reduction in transportation cost, simplification of production steps and the maintenance of the particle shape and size, by using an inorganic powder surface-treated with a dispersant having a specific range of solubility and adding a small amount of water and /or methanol adjusted in an amount and a concentration so as to satisfy the specific conditions, and that a polyester composition having an excellent performance is provided by using the glycol dispersion in films, fibers and molded articles, thus completed the present invention.

The present invention is, in a first aspect, to provide a glycol dispersion of an inorganic powder which comprises glycol and an inorganic powder dispersed therein, said inorganic powder being surface-treated with a dispersant having a solubility of not less than 5 (g/100 g-water) in water of 20° C., and which contains water and/or methanol in a range to satisfy the following equations (1) to (3):

$$1 \leq A \leq 20/t \quad (1)$$

$$0.5 \leq B \leq 10 \quad (2)$$

$$5 \leq C \quad (3)$$

wherein
A: % by weight of water and/or methanol based on the inorganic powder,
t: % by weight of the dispersant based on the inorganic powder,
B: % by weight of water and/or methanol in the glycol dispersion,
C: % by weight of the inorganic powder in the glycol dispersion.

The present invention is, in a second aspect, to provide a method for producing a glycol dispersion of an inorganic powder which comprises the following steps of:

surface-treating an inorganic powder with a dispersant having a solubility of not less than 5 (g/100 g-water) in water of 20° C., and dispersing the surface-treated inorganic powder in glycol together with water and/or methanol so as to satisfy the following equations (1) to (3):

$$1 \leq A \leq 20/t \quad (1)$$

$$0.5 \leq B \leq 10 \quad (2)$$

$$5 \leq C \quad (3)$$

wherein
A: % by weight of water and/or methanol based on the inorganic powder,
t: % by weight of the dispersant based on the inorganic powder,
B: % by weight of water and/or methanol in the glycol dispersion,
C: % by weight of the inorganic powder in the glycol dispersion.

The present invention is, in a third aspect, to provide a polyester composition containing the above-mentioned glycol dispersion of an inorganic powder.

BEST MODE FOR CARRYING OUT THE INVENTION

Figure 1:
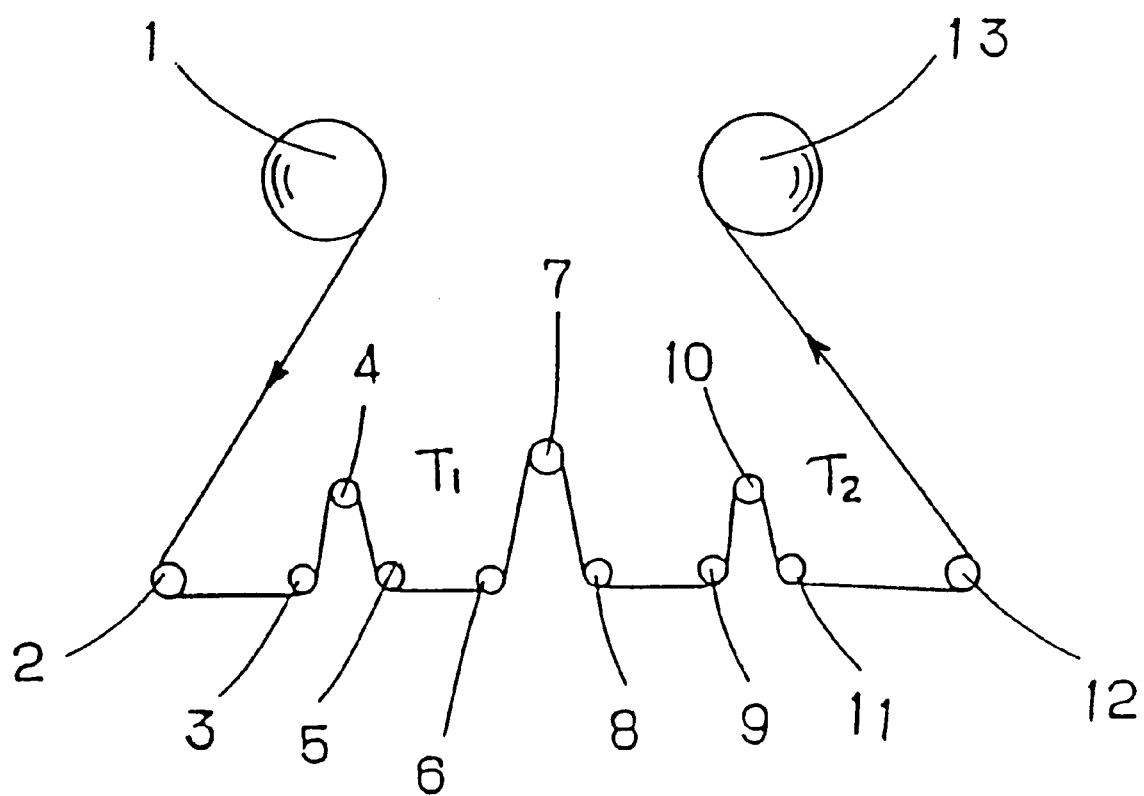
FIG. 1 is a schematic illustration of an apparatus usable for the measurement of a coefficient of friction of a film.

As the inorganic powder usable in the present invention, there is no specific limitation if it is usually usable for a polyester, such as titanium dioxide, silica, alumina, kaolin, talc, calcium carbonate and calcium phosphate (apatite etc.). Among those, titanium dioxide, silica, talc, kaolin, calcium carbonate and calcium phosphate are preferable, and a spherical silica and a hexahedron precipitated calcium carbonate which are nearly in a state of monodispersion at the time of preparation are most preferable, from the viewpoint that a glycol dispersion is prepared without breakage of the particle shape. These may be used singly or in combination of two or more.

As the average particle size of the inorganic powder, there is no specific limitation if it is usually added to a polyester film or fiber, but the range of 0.01 to 15 μm is preferable, the range of 0.05 to 5 μm is more preferable, and the range of 0.05 to 2 μm is most preferable from the viewpoint of being appropriate fine particles and a good dispersion state being kept. In the case of too fine particles, dispersibility of the particles tends to be prevented, and in the case of too coarse particles, the particles tend to precipitate in a glycol slurry or to damage the smoothness of the suface of a polyester.

The dispersant with which the inorganic particles are surface-treated is required to have a solubility of not less than 5 (g/100 g-water) in water of 20° C., preferably not less than 20, more preferably not less than 50. That is because a high solubility to water is desirous since it need to be dissolved rapidly in an extremely small amount of water to be added.

As the dispersant, there are included alkali metal salts of condensed phosphoric acids such as potassium tripolyphosphate and sodium hexametaphosphate; alkali metal salts of alicyclic or aromatic resin acids such as abietic acid, neoabietic acid, benzoic acid and cinnamic acid; sulfonic acid compounds such as alkylsulfonic acid and alkyl benzene sulfonic acid; sulfuric acid compounds such as alkylsulfuric acid and alkyl ether sulfuric acid; phosphoric acid compounds such as alkylphosphoric acid and alkyl ether phosphoric acid; esters such as methyl ester, ethyl ester and hexyl ester, or salts of alkali metals, ammonium and amine of those acid compounds; cellulose compounds such as hydroxyethyl cellulose and carboxymethylcellulose; unsaturated carboxylic acids such as acrylic acid, methacrylic acid and maleic acid, and polymers thereof; copolymers of those unsaturated carboxylic acids and monomers copolymerizable therewith such as alkyl acrylates, alkyl methacrylates, acrylates and methacrylates having alkoxy groups, polyalkyleneglycol monoacrylates and methacrylate vinyl esters, partial or complete neutralized substances such as alkali metal, ammonium and amine salts of those copolymers. These may be used singly or in combination of two or more.

The amount of the dispersant treated is not limited in particular, but is usually 0.01 to 10 parts by weight, preferably 0.01 to 5 parts by weight based on 100 parts by weight of the inorganic powder. If it is less than 0.01 parts by weight, the surface-treated effect is not sufficient, and if it is more than 10 parts by weight, besides being uneconomical, the polymerization is occasionally prevented.

As the method for surface-treating the inorganic powder with the dispersant, any method conducted conventionally may be used. For example, in the case of an inorganic powder such as ground calcium carbonate, kaolin and talc which are produced by a dry-pulverization, the dispersant may be adsorbed onto the surface of the inorganic powder by the use of a mixer such as a Super Mixer, or the inorganic powder may be suspended in water or alcohol into which the dispersant may be mixed in a predetermined amount, followed by drying by the use of a dryer such as a spray dryer. In the case of an inorganic powder such as a precipitated calcium carbonate, which is synthesized in an aqueous system, it may be obtained as a powder, then subjected to the above dry treatment, but it is advantageous in cost to add the dispersant to a suspension immediately after reaction or a condensed liquid thereof, followed by drying. Moreover, since it is possible to reproduce the dispersion before drying of an inorganic powder according to the present invention and thus the inorganic powder may also be prepared as particles having the dispersibility near to a single particle, or may also be adjusted advantageously to the desired particle size, if necessary, by a wet-pulverization or the like. In this case, the dispersant may be added at any time without damaging the effects of the present invention, if an inorganic powder is in a state of an aqueous slurry.

The inorganic powder surface-treated with the dispersant is dried and pulverized by an ordinary method to thus obtain the inorganic powder of the present invention.

As the glycol in which the inorganic powder surface-treated with the dispersant preliminarily is dispersed, aliphatic glycols having a carbon number of 2 to 10 such as ethylene glycol, trimethylene glycol, tetramethylene glycol, pentamethylene glycol, hexamethylene glycol and decamethylene glycol; alicylic diols such as cyclohexanedimethanol; aromatic diols such as 2,2'-bis (4-hydroxyphenyl) propane and hydroquinone are exemplified. These may be used singly or in combination of two or more.

The method for dispersing the inorganic powder in glycol is characterized in that a trace amount of water and/or methanol is contained when the inorganic powder and glycol are mixed, and that the amount of water and/or methanol should satisfy the specific equations as described below.

First, in the equation (1), the amount A (% by weight) of water and/or methanol satisfying $1 \leq A \leq 20/t$ based on the amount t (% by weight) of the dispersant based on the inorganic powder is determined. If A is less than 1, the amount of water and/or methanol does not arrive at a level enough for the dispersant to achieve its function to thus cause a decrease in dispersibility, inversely, if A is more than 20/t, the amount of water and/or methanol at the time of polymerization increases excessively to thus cause hydrolysis of a polyester or bumping in the polymerization of a polyester.

Second, in the equation (2), the amount B (% by weight) of water and/or methanol in the glycol dispersion is determined in a range of 0.5 to 10. If it is less than the lower limit, the function of the dispersant is not provided, inversely, if it is more than the upper limit, the same undesirable phenomenon as in the equation (1) occur.

Third, in the equation (3), the amount C (% by weight) of the inorganic powder contained in the glycol dispersion, i.e., the solid concentration is adjusted to not less than 5. If it is less than 5, a sufficient shear is not imposed on the individual particles to thus cause a decrease in dispersibility. For this reason, the solid concentration should be made as high as possible, preferably not less than 30, more preferably not less than 40. After the glycol dispersion is prepared once, it may be adjusted with glycol to the desired concentration.

When the glycol dispersion is prepared, water and methanol may be used conjointly. If the solubility in water of a dispersant is not less than 5 and the solubility in methanol is also not less than 5, the amount of water added may be further reduced, and in some cases the dispersion is possible without addition of water.

Moreover, attention is called to water (and/or methanol) adsorbed to an inorganic powder when water and/or methanol is added. The amount of water (and/or methanol) in the above equations naturally contains water (and/or methanol) adsorbed.

In dispersing a glycol slurry added with water and/or methanol, the use of a pulverizer using a medium such as a Sand Grinder Mill is not necessary and the glycol dispersion of the present invention is obtained if mixed sufficiently by the use of an ordinary stirrer, but it may, if necessary, be further subjected to the adjustment of the particle size by the use of a wet-pulverizer, an impact-type high pressure disperser, a supersonic wave disperser or the like, and thereafter, may be subjected, if necessary, to the removal of coarse particles by the use of a filter having a pore size of approximately 10 µm or less, a super decanter or the like. In this method, the glycol dispersion maintaining the particle shape and size of the inorganic powder before drying or in the initial state is obtained.

The glycol dispersion is blended with a polyester to obtain a polyester composition.

As the polyester, there may be exemplified polyesters comprising aromatic dicarboxylic acids as the main acid component and aliphatic glycols, alicyclic diols and aromatic diols as the main glycol component.

As the aromatic dicarboxylic acid, for example, terephthalic acid, naphthalenedicaboxylic acid, isophthalic acid, diphenylethanedicarboxylic acid, diphenyldicarboxylic acid, diphenyletherdicarboxylic acid, diphenylsulfonedicarboxylic acid, diphenylketonedicarboxylic acid and anthracenedicarboxylic acid are exemplified. These may be used singly or in combination of two or more. As the polyester comprising these as the main components, polyesters having, for example, alkyleneterephthalate and/or alkylenenaphthalate as its main component are preferably used.

The amount of the glycol dispersion added to a polyester is not determined unconditionally, depending on the kind or use of the polyester, but in the case of a polyester film, the range of 0.005 to 3 parts by weight in terms of an inorganic powder is appropriate, and the range of 0.01 to 1 part by weight in terms of an inorganic powder is preferable, based on 100 parts by weight of a polyester resin. If it is less than the lower limit, the intended effect is not sufficient, since the amount added is not only scanty, but the accuracy of uniformly dispersing it into the polyester resin lowers, inversely, if it is more than the upper limit, the physical properties are not improved in proportion to the amount added and inconveniences such as a decrease in stretching property take place.

The polyester obtained from the polyester composition of the present invention is suited to fibers and films, in particular, to films for use in videotapes, audiotapes, condensers, photo resists, packages for foods, prepaid cards or the like, in which excellent anti-blocking effect as well as electric properties is required.

Hereinafter, the present invention will be explained in more detail by way of examples and comparative examples, by which the present invention is in no way limited.

With respect to the evaluation, the particle size distributions of a water slurry before drying and a glycol dispersion are measured by the method as set forth below for observing the dispersion reproducibility of a glycol dispersion. As a synthetic resin, a polyethyleneterephthalate film is made and evaluated for the properties as set forth below.

Measurement of the Particle Size Distribution

Measuring device: MICROTRAC FRA manufactured by Leeds & Northrup

Solvent: Ethylene glycol

Specimen: Into 50 cm$^3$ of a solvent, 2 to 3 g of a water slurry before drying or a glycol dispersion are added and stirred adequately.

The results obtained by the above-mentioned methods are compared with respect to the following properties:

D10: Particle size ($\mu$m) accounting for 10% by weight as measured from the larger particle size side in the particle size distribution measured D50: Particle size ($\mu$m) accounting for 50% by weight as measured from the larger particle size side in the particle size distribution measured D90: Particle size ($\mu$m) accounting for 90% by weight as measured from the larger particle size side in the particle size distribution measured D10/D90: Indication showing variability in the particle size distribution. As the value becomes closer to 1, the particle size distribution becomes sharper.

5 $\mu$m<: weight % of coarse particles of more than 5 $\mu$m in the particle size distribution measured Production of polyethyleneterephthalate film:

Ethylene glycol dispersions described in Tables 1 to 3 were added prior to a polyesterification, followed by a polyesterification reaction, to thus obtain polyethyleneterephthalates containing 0.1% by weight of the particles and having a limiting viscosity number (orthochlorophenol, 35° C.) of 0.62 dl/g. The polyethyleneterephthalates were dried at 160° C., followed by a melt extrusion at 290° C., rapidly cooled and solidified on a casting drum having a temperature maintained at 40° C., to thereby obtain unstretched films. The thus obtained unstretched films were pre-heated at 70° C. by a heating roller, stretched 3.6 times to the longitudinal direction while heating with an infrared heater, and then stretched 4.0 times to the lateral direction at 90° C., followed by heat treatment at 200° C. Thus, biaxially oriented films having a thickness of 15 $\mu$m were obtained.

The quality of the thus obtained films was evaluated according to the following methods.

① Surface Roughness of the Film(Ra)

The surface roughness of the film is a value defined as a center line average height (Ra) of JIS-B0601. In the present invention, a tracer type surface roughness tester of Kosaka Kenkyusho Co., Ltd., (SURFCORDER SF -30C) was used to measure the center line average height. Measuring conditions are as follows:

(a) Radius of a head of the tracer: 2 $\mu$m, (b) Measuring pressure: 30 mg, (c) Cut off: 0.25 mm, (d) Length for measurement: 0.5 mm, and (e) An average value is calculated from 4 data obtained by excluding the highest value from 5 repeated values on the same sample.

② Friction Coefficient of the Film ($\mu$k)

The friction coefficient is measured by using an apparatus shown in FIG. 1. In FIG. 1, each number shows parts of the apparatus, respectively, as follows: 1: unwinding reel; 2: tension controller; 3,5,6,8,9 and 11: free roller; 4: tension detector (inlet); 7: fixing bar (outer diameter:5 mm) made of stainless steel net, SUS304; 10: tension detector (outlet); 12: guide roller; and 13: winding reel.

Under conditions of a temperature of 20 and a humidity of 60%, a film cut to ½ inch width was contacted with the fixing bar 7 (surface roughness: 0.3 $\mu$m) at an angle of θ=(152/180)π radian (152°) and moved (frictioned) at a rate of 200 cm per minute. When the tension controller is adjusted so that the inlet tension T1 is 35 g, the outlet tension (T2:g) is detected by the outlet tension detector after 90 meter run of the film. The traveling friction coefficient pk is calculated from the following equation:

$$\mu k=(2.303/\theta)\log(T2/T1)=0.86 \log(T2/35)$$

③ Evaluation of Abrasion-I

A surface of the film of ½ inch width is contacted with a stainless steel fixing pin (surface roughness 0.58 $\mu$m) having a diameter 5 mm at an angle of 150°, and the fixing pin is moved and frictioned reciprocally about 15 cm intervals at a rate of 2 meters per minute. In this case, the inlet tension T1 is 60 g.

The above operations are repeated, and after 40 reciprocal movements, a degree of scratches raised on the surface of the film is visually examined. The evaluation of the scratches is conducted according to the four-rank criteria:

<Four-rank Criteria> a: Scratches are scarcely found.

b: A few scratches are found.

c: A considerably many scratches are found.

d: Scratches are found all over the surface.

④ Evaluation of Abrasion-II

Shavingness of the running surface of the film is evaluated by using a 5 layered minisuper calender. The calendar is comprised of 5 layered of Nylon rolls and steel rolls. A treatment temperature is 80 and a linear load on the film is 200 kg/cm. A film speed is 50 meters/minute. After running of 4000 meters in total, the shavingness of the film is evaluated by the three-rank criteria by smudge adhered to the top roll of the calender.

<Three-rank Criteria>
   a: No smudge on the roll
   b: Little smudge on the roll
   c: Smudge on the roll
(5) Number of Coarse Protrusions on the Film Surface After aluminum is thinly vapor deposited on the film surface, the number of coarse protrusions with four or more quartet circles (number per 1 mm$^2$ of the measuring area) is counted by using a binary beam interference microscope, and ranked according to the number of the coarse protrusions:
   1st class: not less than 16; 2nd class: 12–15;
   3rd class: 8–11; 4th class: 4–7; and
   5th class: 0–3

Method for preparing inorganic particles U, V, W used in examples and comparative examples:

Inorganic Particles U 100 liters of an aqueous sodium carbonate solution having a 1.0 mol/liter concentration (X solution), 100 liters of an aqueous calcium chloride solution having a 0.9 mol/liter concentration (Y solution) and an aqueous sodium hydroxide solution having a 0.03 mol/liter concentration (Z solution) were prepared, respectively.

The X solution and the Z solution were mixed and controlled to 19° C. Into the mixed solution, the Y solution controlled to 17° C. was added dropwise. The mixed (reacted) solution had the pH 12 and the pH value was lowered to 9 by repeating dehydration and washing with service water, followed by condensation to thus obtain inorganic particles U made of a precipitated calcium carbonate.

The calcium carbonate obtained was observed by an electron microscope and found to be hexahedron particles having an average particle size of 1.6 μm. The particle size distribution is shown in Tables 1 and 2.

Using the inorganic particles obtained, the procedures described in Examples 1, 3 and Comparative Examples 1 to 3 as will be described later were carried out to thus form glycol dispersions. Inorganic particles V:

Inorganic particles V made of a precipitated calcium carbonate were obtained in the same manner as in the inorganic particles U, except that the concentrations of the X, Y and Z solutions were changed to 1.5 mol/liter, 1.4 mol/liter, 0.04 mol/liter, respectively.

The calcium carbonate obtained was observed by an electron microscope and found to be hexahedron particles having an average particle size of 0.5 μm. The particle size distribution is shown in Tables 1 and 2.

Using the inorganic particles obtained, the procedures described in Examples 2, 9 and Comparative Example 4 as will be described later were carried out to thus form glycol dispersions. Inorganic particles W:

Using a commercially available titanium oxide (average particle size: 0.7 μm), a water slurry having a solid concentration of 50% by weight was formed and wet-pulverized by the use of a wet-pulverizer (DYNO®-MILL manufactured by WAV Corp.) to thus obtain inorganic particles W made of titanium oxide having an average particle size of 0.4 μm. The particle size distribution is shown in Table 3.

Using the inorganic particles obtained, the procedures described in Example 4 and Comparative Example 5 as will be described later were carried out to thus form a glycol dispersion.

EXAMPLE 1

By repeating dehydration and washing with water of the above-mentioned inorganic particles U by the use of a centrifugal dehydrator, a water slurry having a solid concentration of 50% by weight was obtained, then to the slurry, 0.4% by weight of a sodium polyacrylate (solubility in water: 900) was added and mixed, followed by drying by the use of a spray dryer to thus obtain an inorganic powder surface-treated with the dispersant. In dispersing the inorganic particles in glycol, water and ethylene glycol in amounts described in Table 1 were added to prepare an ethylene glycol slurry having a solid concentration of 62% by weight. The ethylene glycol slurry obtained was stirred for 30 minutes by the use of a stirrer having a disc type stirring blade to thus obtain an ethylene glycol dispersion.

The particle size distribution of the glycol dispersion obtained is shown in Table 1, from which it is understood that the particle size distribution before drying was maintained and reproduced.

EXAMPLE 2

By repeating dehydration and washing with water of the above-mentioned inorganic particles V by the use of a centrifugal dehydrator, a water slurry having a solid concentration of 30% by weight was obtained, then to the slurry, 1.2% by weight of a sodium salt of an acrylic acid-polyethylene glycol monomethacrylate copolymer (weight ratio: 7/3) (solubility in water: 150) were added and mixed, followed by drying by the use of a spray dryer to thus obtain an inorganic powder surface-treated with the dispersant. In dispersing the inorganic particles in glycol, water and ethylene glycol in amounts described in Table 1 were added to prepare an ethylene glycol slurry having a solid concentration of 50% by weight. The ethylene glycol slurry obtained was stirred for 30 minutes by the use of a stirrer having a disc type stirring blade to thus obtain an ethylene glycol dispersion .

The particle size distribution of the glycol dispersion obtained is shown in Table 1, from which it is understood that the particle size distribution before drying was maintained and reproduced.

EXAMPLE 3

An ethylene glycol dispersion having a solid concentration of 70% by weight was obtained in the same manner as in Example 1, except that the amounts of water and ethylene glycol were changed as shown in Table 1.

The particle size distribution of the glycol dispersion obtained is shown in Table 1, from which it is understood that the particle size distribution before drying was maintained and reproduced.

EXAMPLE 4

To a 50% by weight water slurry of the above-mentioned inorganic powder W, 0.7% by weight of a sodium hexametaphosphate (solubility in water: 70) was added and mixed, followed by drying by the use of a spray dryer to thus obtain an inorganic powder surface-treated with the dispersant. In dispersing the inorganic particles in glycol, water and ethylene glycol in amounts described in Table 3 were added to prepare an ethylene glycol slurry having a solid concentration of 50% by weight. The ethylene glycol slurry obtained was stirred for 30 minutes by the use of a stirrer having a disc type stirring blade to thus obtain an ethylene glycol dispersion.

The particle size distribution of the glycol dispersion obtained is shown in Table 3, from which it is understood that the particle size distribution before drying is maintained and reproduced.

Comparative Example 1

An ethylene glycol dispersion having a solid concentration of 50% by weight was obtained in the same manner as in Example 1, except that the amounts of water and ethylene glycol were changed as shown in Table 2.

The particle size distribution of the glycol dispersion obtained is shown in Table 2, from which it is understood that the particle size distribution is greatly different from that before drying.

Comparative Example 2

An ethylene glycol dispersion having a solid concentration of 15% by weight was obtained in the same manner as in Example 1, except that the amounts of water and ethylene glycol were changed as shown in Table 2.

The particle size distribution of the glycol dispersion obtained is shown in Table 2, from which it is understood that the particle size distribution is greatly different from that before drying.

Comparative Example 3

An ethylene glycol dispersion having a solid concentration of 45% by weight was obtained in the same manner as in Example 1, except that the amounts of water and ethylene glycol were changed as shown in Table 2.

The particle size distribution of the glycol dispersion obtained is shown in Table 2. As is apparent from Table 2, the particle size distribution before drying was maintained and reproduced, but because of a large amount of water contained in the glycol dispersion, an excellent film was not obtained from the glycol dispersion, as shown by comparative example that will be described later.

Comparative Example 4

A 50% by weight water slurry of the above-mentioned inorganic particles V was prepared in the same manner as in Example 2, then to the slurry, 3.0% by weight of a sodium oleate (solubility in water: 2) were added and mixed, followed by drying and pulverizing to thus obtain an inorganic powder surface-treated with the dispersant. In dispersing the inorganic particles in glycol, water and ethylene glycol in amounts described in Table 2 were added to prepare an ethylene glycol slurry having a solid concentration of 30% by weight. The ethylene glycol slurry obtained was stirred for 30 minutes by the use of a stirrer having a disc type stirring blade to thus obtain an ethylene glycol dispersion.

The particle size distribution of the glycol dispersion obtained is shown in Table 2, from which it is understood that the particle size distribution is greatly different from that before drying.

Comparative Example 5

An inorganic powder surface-treated was prepared by changing the dispersant to 2.0% by weight of hexanoic acid (solubility in water: 1) and drying and pulverizing. In dispersing the inorganic particles in glycol, water and ethylene glycol in amounts described in Table 3 were added to prepare an ethylene glycol slurry having a solid concentration of 60% by weight. The ethylene glycol slurry obtained was stirred for 30 minutes by the use of a stirrer having a disc type stirring blade to thus obtain an ethylene glycol dispersion.

The particle size distribution of the glycol dispersion obtained is shown in Table 3, from which it is understood that the particle size distribution is greatly different from that before drying.

EXAMPLE 9

By repeating dehydration and washing with water of the above-mentioned inorganic particles V by the use of a centrifugal dehydrator, a water slurry having a solid concentration of 30% by weight was obtained, then to the slurry, 1.1% by weight of an amine salt of an acrylic acid-polyethylene glycol monomethacrylate copolymer (weight ratio: 7/3) (solubility in water: 100) was added and mixed, followed by drying by the use of a spray dryer to thus obtain an inorganic powder surface-treated with the dispersant. In dispersing the inorganic particles in glycol, water and ethylene glycol in amounts described in Table 3 were added to prepare an ethylene glycol slurry having a solid concentration of 45% by weight. The ethylene glycol slurry obtained was stirred for 30 minutes by the use of a stirrer having a disc type stirring blade to thus obtain an ethylene glycol dispersion.

The particle size distribution of the glycol dispersion obtained is shown in Table 3, from which it is understood that the particle size distribution before drying was maintained and reproduced.

TABLE 1

| | | Inorganic particles U | Inorganic particles V |
|---|---|---|---|
| Water slurry (before drying) | D10 ($\mu$m) | 2.08 | 0.80 |
| | D50 ($\mu$m) | 1.59 | 0.51 |
| | D90 ($\mu$m) | 1.20 | 0.34 |
| | D10/D90 | 1.73 | 2.35 |
| | 5 $\mu$m< (%) | 0 | 0 |

| | | Example 1 | Example 3 | Example 2 |
|---|---|---|---|---|
| Dispersant | Kind | Sodium polyacrylate | | Sodium salt of acrylic acid-polyethylene glycol monomethacrylate copolymer |
| | Solubility | 900 | | 150 |
| | Amount treated t (%) | 0.4 | | 1.2 |
| X (%) | | 6.0 | 3.3 | 1.5 |
| Y (%) | | 0.2 | 0.2 | 0.5 |
| Z (%) | | 31.8 | 26.5 | 48.0 |
| Kind of X | | Water | Water | Water |
| 20/t | | 50 | | 16.67 |

TABLE 1-continued

| | | | | |
|---|---|---|---|---|
| Glycol dispersion | A (%) | 10.0 | 5.0 | 4.0 |
| | B (%) | 6.2 | 3.5 | 2.0 |
| | C (%) | 62 | 70 | 50 |
| | D10 (μm) | 2.10 | 2.05 | 0.70 |
| | D50 (μm) | 1.59 | 1.59 | 0.48 |
| | D90 (μm) | 1.20 | 1.19 | 0.33 |
| | D10/D90 | 1.75 | 1.72 | 2.12 |
| | 5 μm< (%) | 0 | 0 | 0 |

A: % by weight of water and/or methanol based on the inorganic powder
t: % by weight of the dispersant based on the inorganic powder
B: % by weight of water and/or methanol in the glycol dispersion
C: % by weight of the inorganic powder in the glycol dispersion
X: % by weight of water and/or methanol added into a glycol dispersion
Y: % by weight of water adsorbed onto an inorganic powder
Z: % by weight of ethylene glycol added into a glycol dispersion

TABLE 2

| | | Inorganic particles U | Inorganic particles V |
|---|---|---|---|
| Water slurry (before drying) | D10 (μm) | 2.08 | 0.80 |
| | D50 (μm) | 1.59 | 0.51 |
| | D90 (μm) | 1.20 | 0.34 |
| | D10/D90 | 1.73 | 2.35 |
| | 5 μm< (%) | 0 | 0 |

| | | Comp. Ex. 1 | Comp. Ex. 2 | Comp. Ex. 3 | Comp. Ex. 4 |
|---|---|---|---|---|---|
| Dispersant | Kind | Sodium polyacrylate | | | Sodium oleate |
| | Solubility | 900 | | | 2.0 |
| | Amount treated t (%) | 0.4 | | | 3.0 |
| X (%) | | 0.05 | 0.1 | 26.8 | 2.6 |
| Y (%) | | 0.2 | 0.2 | 0.2 | 0.4 |
| Z (%) | | 49.75 | 84.7 | 28.0 | 47.0 |
| Kind of X | | Water | Water | Water | Water |
| 20/t | | | 50 | | 6.67 |
| Glycol dispersion | A (%) | 10.0 | 5.0 | 5.0 | 6.0 |
| | B (%) | 6.2 | 3.5 | 3.5 | 3.0 |
| | C (%) | 62 | 70 | 70 | 50 |
| | D10 (μm) | 2.10 | 2.05 | 2.05 | 43.94 |
| | D50 (μm) | 1.59 | 1.59 | 1.59 | 0.59 |
| | D90 (μm) | 1.20 | 1.19 | 1.19 | 0.34 |
| | D10/D90 | 1.75 | 1.72 | 1.72 | 129.23 |
| | 5 μm< (%) | 0 | 0 | 0 | 32.15 |

A: % by weight of water and/or methanol based on the inorganic powder
t: % by weight of the dispersant based on the inorganic powder
B: % by weight of water and/or methanol in the glycol dispersion
C: % by weight of the inorganic powder in the glycol dispersion
X: % by weight of water and/or methanol added into a glycol dispersion
Y: % by weight of water adsorbed onto an inorganic powder
Z: % by weight of ethylene glycol added into a glycol dispersion

TABLE 3

| | | Inorganic particles W | Inorganic particles V |
|---|---|---|---|
| Water slurry (before drying) | D10 (μm) | 0.51 | 0.82 |
| | D50 (μm) | 0.36 | 0.53 |
| | D90 (μm) | 0.25 | 0.34 |
| | D10/D90 | 2.04 | 2.41 |
| | 5 μm< (%) | 0 | 0 |

| | | Example 4 | Example 5 | Example 9 |
|---|---|---|---|---|
| Dispersant | Kind | Sodium hexameta phosphate | Hexanoic acid | Amine salt of acrylic acid-polyethylene glycol monomethacrylate copolymer |
| | Solubility | 70 | less than 1.0 | 100 |

TABLE 3-continued

|  |  |  |  |  |
|---|---|---|---|---|
|  | Amount treated t (%) | 0.7 | 2.0 | 1.1 |
| X (%) |  | 4.6 | 3.6 | 4.0 |
| Y (%) |  | 0.4 | 0.4 | 0.5 |
| Z (%) |  | 45.0 | 36.0 | 50.5 |
| Kind of X |  | Water | Water | Water |
| 20/t |  | 28.57 | 10.0 | 18.18 |
| Glycol dispersion | A (%) | 10 | 6.67 | 10 |
|  | B (%) | 5.0 | 4.0 | 4.5 |
|  | C (%) | 50 | 60 | 45 |
|  | D10 (μm) | 0.62 | 17.15 | 0.82 |
|  | D50 (μm) | 0.39 | 0.55 | 0.54 |
|  | D90 (μm) | 0.28 | 0.33 | 0.33 |
|  | D10/D90 | 2.21 | 51.97 | 2.48 |
|  | 5 μm< (%) | 0 | 22.10 | 0 |

A: % by weight of water and/or methanol based on the inorganic powder
t: % by weight of the dispersant based on the inorganic powder
B: % by weight of water and/or methanol in the glycol dispersion
C: % by weight of the inorganic powder in the glycol dispersion
X: % by weight of water and/or methanol added into a glycol dispersion
Y: % by weight of water adsorbed onto an inorganic powder
Z: % by weight of ethylene glycol added into a glycol dispersion

EXAMPLES 5 TO 8 AND 10

Using the ethylene glycol dispersions prepared in Examples 1 to 4 and 9, polyester films were prepared in the above-mentioned manner and properties were evaluated. The results are shown in Table 4.

Comparative Examples 6 to 9

Using the ethylene glycol dispersions prepared in Comparative Examples 1 to 5, polyester films were prepared in the above-mentioned manner and properties were evaluated. However, the ethylene glycol dispersion prepared in Comparative Example 3 contained a large amount of water and bumped, and thus the evaluation of a film was not conducted.

Reference Example 1

Inorganic particles U surface-treated was obtained in the same manner as in Example 1, and the inorganic particles and water were stirred vigorously and mixed to thus prepare a water slurry having a solid concentration of 50% by weight. With this slurry, ethylene glycol in the predetermined amount was mixed and water was removed by the use of an evaporator to thus obtain an ethylene glycol dispersion of the inorganic particles U. Using the glycol dispersion obtained, a polyester film was formed in the same manner as in Example 5. The evaluation results are shown in Table 4.

Reference Example 2

Inorganic particles V surface-treated was obtained in the same manner as in Example 2, and the inorganic particles and water were stirred vigorously and mixed to thus prepare a water slurry having a solid concentration of 50% by weight. With this slurry, ethylene glycol in the predetermined amount was mixed and water was removed by the use of an evaporator to thus obtain an ethylene glycol dispersion of the inorganic particles V. Using the glycol dispersion obtained, a polyester film was formed in the same manner as in Example 6. The evaluation results are shown in Table 4.

From the comparison with Reference Examples 1 and 2, it is understood that the ethylene glycol dispersions obtained in Examples 1 to 4 and 9 do not require a large amount of energy and that they provide films having excellent properties identical to those of Reference Examples 1 and 2.

TABLE 4

| | Ethylene glycol dispersions used | Evaluation results of polyester films ||||
|---|---|---|---|---|---|---|
| | | Surface roughness Ra (μm) | Friction coefficient (μk) | Abrasion I | Abrasion II | Coarse protrusions |
| Ref. Ex. 1 | — | 0.018 | 0.15 | b | b | 5th class |
| Ref. Ex. 2 | — | 0.013 | 0.14 | a | a | 5th class |
| Example 5 | Example 1 | 0.018 | 0.15 | b | b | 5th class |
| Example 6 | Example 2 | 0.013 | 0.14 | a | a | 5th class |
| Example 7 | Example 3 | 0.018 | 0.15 | b | b | 5th class |
| Example 8 | Example 4 | 0.020 | 0.16 | b | b | 4th class |
| Example 10 | Example 9 | 0.017 | 0.15 | b | b | 5th class |
| Comp. Ex. 6 | Comp. Ex. 1 | 0.028 | 0.15 | d | c | 1st class |
| Comp. Ex. 7 | Comp. Ex. 2 | 0.029 | 0.15 | c | c | 2nd class |
| Comp. Ex. 8 | Comp. Ex. 4 | 0.033 | 0.15 | d | c | 1st class |
| Comp. Ex. 9 | Comp. Ex. 5 | 0.033 | 0.16 | d | c | 1st class |

Industrial Applicability

As stated above, according to the present invention, it is possible to transport in the form of powder and to make a glycol dispersion at a factory where they are used so that a drastic simplification in the production steps and a cost reduction are attainable because neither a distillation apparatus for replacing a solvent such as water and methanol with glycol nor a step of wet-pulverizing is required. Moreover, it is possible to make a glycol dispersion by dispersing in glycol the inorganic powder with the particle shape and size maintained before drying or in the initial state, and as a result, it is possible to provide a polyester composition containing the glycol dispersion of an inorganic powder uniformly dispersed therein.

What is claimed is:

1. A glycol dispersion of an inorganic powder which comprises glycol and an inorganic powder dispersed therein, said inorganic powder being surface-treated with a dispersant other than glycol having a solubility of not less than 5 (g/100 g water) in water of 20° C., and which contains water and/or methanol in a range to satisfy the following equations (1) to (3):

$$1 \leq A \leq 20/t \quad (1)$$
$$0.5 \leq B \leq 10 \quad (2)$$
$$5 \leq C \quad (3)$$

wherein
- A: % by weight of water and/or methanol based on the inorganic powder
- t: % by weight of the dispersant based on the inorganic powder
- B: % by weight of water and/or methanol in the glycol dispersion
- C: % by weight of the inorganic powder in the glycol dispersion.

2. The glycol dispersion of an inorganic powder of claim 1, wherein the dispersant is selected from the group consisting of alkali metal salts of condensed phosphoric acids, alkali metal salts of alicyclic or aromatic resin acids, sulfonic acid-containing compounds, sulfuric acid-containing compounds, phosphoric acid-containing compounds, esters, salts of alkali metals, ammonium and amine of said acid-containing compounds, cellulose-containing compounds, unsaturated carboxylic acids, polymers of unsaturated carboxylic acids and copolymers of unsaturated carboxylic acids and monomers copolymerizable therewith, and partially or completely neutralized polymers of unsaturated carboxylic acids and copolymers of unsaturated carboxylic acids and monomers copolymerizable therewith.

3. The glycol dispersion of an inorganic powder of claim 1, wherein the inorganic powder is at least one selected from the group consisting of calcium carbonate, titanium dioxide, silica, talc, kaolin and calcium phosphate.

4. The glycol dispersion of an inorganic powder of claim 3, wherein the dispersant is selected from the group consisting of alkali metal salts of condensed phosphoric acids, alkali metal salts of alicyclic or aromatic resin acids, sulfonic acid-containing compounds, sulfuric acid-containing compounds, phosphoric acid-containing compounds, esters, salts of alkali metals, ammonium and amine of said acid-containing compounds, cellulose-containing compounds, unsaturated carboxylic acids, polymers of unsaturated carboxylic acids and copolymers of unsaturated carboxylic acids and monomers copolymerizable therewith, and partially or completely neutralized polymers of unsaturated carboxylic acids and copolymers of unsaturated carboxylic acids and monomers copolymerizable therewith.

5. A polyester composition containing the glycol dispersion of an inorganic powder defined in claim 1.

6. The polyester composition of claim 5, wherein the dispersant is selected from the group consisting of alkali metal salts of condensed phosphoric acids, alkali metal salts of alicyclic or aromatic resin acids, sulfonic acid-containing compounds, sulfuric acid-containing compounds, phosphoric acid-containing compounds, esters, salts of alkali metals, ammonium and amine of said acid-containing compounds, cellulose-containing compounds, unsaturated carboxylic acids, polymers of unsaturated carboxylic acids and copolymers of unsaturated carboxylic acids and monomers copolymerizable therewith, and partially or completely neutralized polymers of unsaturated carboxylic acids and copolymers of unsaturated carboxylic acids and monomers copolymerizable therewith.

7. The glycol dispersion of an inorganic powder of claim 1, wherein the following equation (4) is satisfied:

$$3Y \leq X \leq 30Y \quad (4)$$

wherein
- X: % by weight of water and/or methanol added into the glycol dispersion
- Y: % by weight of water adsorbed onto the inorganic powder.

8. A polyester composition containing the glycol dispersion of an inorganic powder defined in claim 7.

9. A method for producing a glycol dispersion of an inorganic powder which comprises the following steps of:
surface-treating an inorganic powder with a dispersant other than glycol having a solubility of not less than 5 (g/100 g water) in water of 20° C., and
dispersing the surface-treated inorganic powder in glycol together with water and/or methanol so as to satisfy the following equations (1) to (3):

$$1 \leq A \leq 20/t \quad (1)$$
$$0.5 \leq B \leq 10 \quad (2)$$
$$5 \leq C \quad (3)$$

wherein
- A: % by weight of water and/or methanol based on the inorganic powder
- t: % by weight of the dispersant based on the inorganic powder
- B: % by weight of water and/or methanol in the glycol dispersion
- C: % by weight of the inorganic powder in the glycol dispersion.

10. The method of claim 9, wherein the dispersant is selected from the group consisting of alkali metal salts of condensed phosphoric acids, alkali metal salts of alicyclic or aromatic resin acids, sulfonic acid-containing compounds, sulfuric acid-containing compounds, phosphoric acid-containing compounds, esters, salts of alkali metals, ammonium and amine of said acid-containing compounds, cellulose-containing compounds, unsaturated carboxylic acids, polymers of unsaturated carboxylic acids and copolymers of unsaturated carboxylic acids and monomers copolymerizable therewith, and partially or completely neutralized polymers of unsaturated carboxylic acids and copolymers of unsaturated carboxylic acids and monomers copolymerizable therewith.

11. The method for producing a glycol dispersion of an inorganic powder of claim 9, wherein the following equation (4) is satisfied:

$$3Y \leq X \leq 30Y \quad (4)$$

wherein

X: % by weight of water and/or methanol added into the glycol dispersion

Y: % by weight of water adsorbed onto the inorganic powder.

* * * * *